Apr. 10, 1923.
I. T. PURCELL
1,451,086
METHOD OF MAKING AND EXHIBITING MOVING PICTURES
Filed Nov. 2, 1921      2 sheets-sheet 1
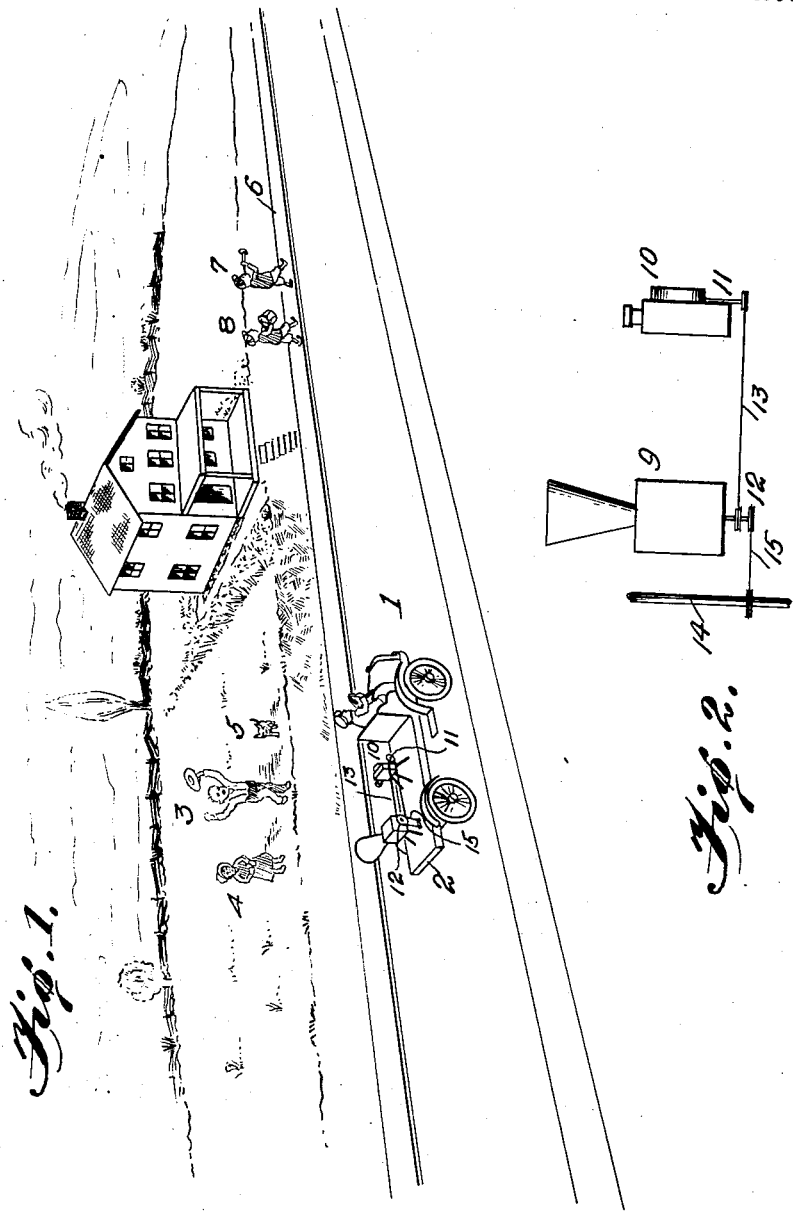
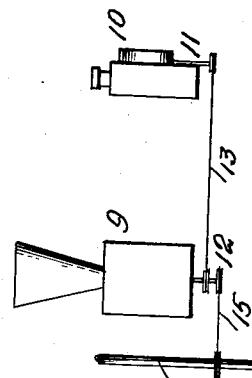
Inventor
Isaac T. Purcell,
By _____
His Attorneys Apr. 10, 1923.
I. T. PURCELL
1,451,086
METHOD OF MAKING AND EXHIBITING MOVING PICTURES
Filed Nov. 2, 1921
2 sheets-sheet 2
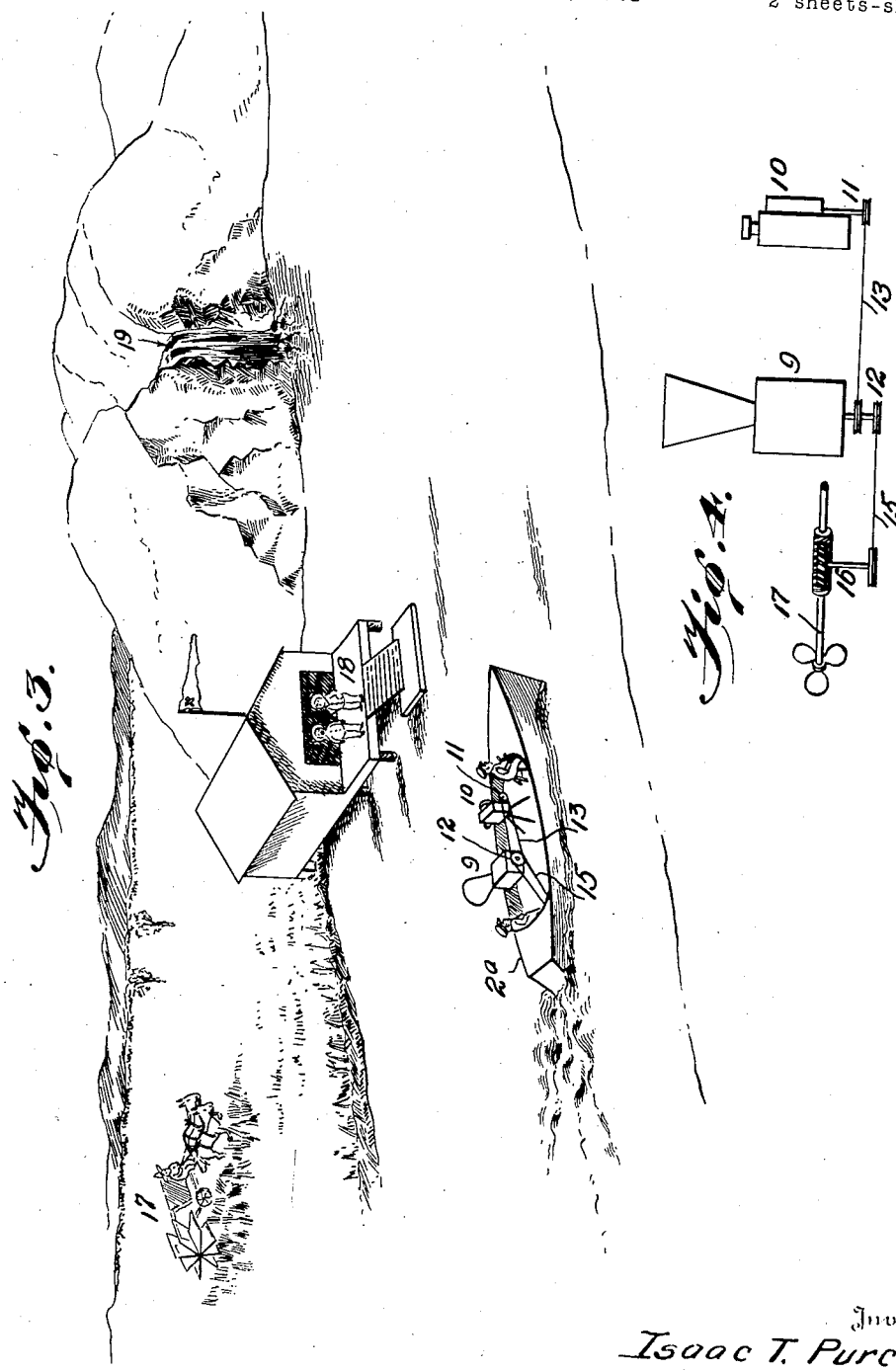
Inventor
Isaac T. Purcell.

Patented Apr. 10, 1923.

1,451,086

UNITED STATES PATENT OFFICE.

ISAAC T. PURCELL, OF WAKEENEY, KANSAS.

METHOD OF MAKING AND EXHIBITING MOVING PICTURES.

Application filed November 2, 1921. Serial No. 512,281.

*To all whom it may concern:*

Be it known that I, ISAAC T. PURCELL, a citizen of the United States, residing at Wakeeney, in the county of Trego and State of Kansas, have invented certain new and useful Improvements in Methods of Making and Exhibiting Moving Pictures, of which the following is a specification, reference being had therein to the accompanying drawings.

This invention relates to means for making and exhibiting realistic pictures or scenes, and the object of the invention is the accurate taking of a picture or a scene in connection with the recording of the sound emanating from the picture or scene.

Another object of the invention is the method of taking a picture and recording the sound in an accurate or timed manner and being able to reproduce the picture or scene in a realistic or natural manner.

With these and other objects in view, my invention comprises certain novel combinations, constructions and arrangements of parts as will be hereinafter described, illustrated in the accompanying drawings, and more particularly pointed out in the appended claim.

In the drawings:

Figure 1 is a perspective view of my apparatus and a scene, while

Figure 2 is a diagram of the apparatus, showing the coordinate parts connected together for accurate work or operation.

Figure 3 is a perspective view of another embodiment of the present invention showing a river or water scene, and Figure 4 is a diagram of my apparatus, showing the coordinate or essential parts of the apparatus connected together, for being driven or operated, in accurate, timed relation, for the efficient recording of a scene, whereby it can be accurately and realistically reproduced.

Referring to the drawings by numerals, 1 designates a road or street over which the traveling support 2 is passing; this support 2 may be a wagon or a motor vehicle. Along the street or roadway is a cheering person 3 and a person 4 clapping her hands. A barking dog 5 is near the persons 3 and 4, while passing along the side-walk 6 is a person 7 blowing a horn, and a person 8 beating a drum.

The traveling support 2 has mounted thereon a sound recording machine 9 and a motion picture camera 10. The camera 10 will photograph the objects as the traveling support 2 moves along, and at the same time, the sound recording machine 9 will record the noise or sound emanating from the picture being photographed, whether it is (as in Fig. 1) a person cheering, a dog barking, or persons playing upon instruments, and the like.

To obtain an accurate result, the motion picture camera is provided with any suitable driving mechanism 11 (Fig. 2), and a sound recording machine 9 is provided with a driving mechanism 12, these mechanisms 11 and 12 being connected by a belt 13, and the driving mechanism 12 is connected to the power shaft 14, of the traveling support 2, by means of a belt 15. The details of the driving mechanisms 11 and 12 of the camera 10 and the recording machine 9, respectively, are immaterial, so long as these machines are operated in unison and accuracy, whereby the objects or scene can be reproduced with such a degree of realistic results that it would substantially be the same as when taking.

Referring to Fig. 3, the traveling support $2^a$ is a boat or vessel and the apparatus carried by said support $2^a$ comprises the sound recording machine 9, the motion picture camera 10 of the same structure as shown in Figs. 1 and 2. The belt (or any suitable connecting means, such as a sprocket chain or shaft, old in the art) 15 is connected, at 16, to the propeller shaft 17 so that the recording machine 9 and camera 10 will be operated to a nicety in timed relation and with accuracy for recording the objects or scene as the boat or traveling support $2^a$ moves along its course. This apparatus, mounted and operated as shown in Figs. 3 and 4, will accurately photograph the object, and record the sound emanating therefrom, such as the harvesting machine 17, or the singing persons upon the wharf 18, or the water falls 19.

It will be understood that two or more sets of apparatuses may be carried by the same traveling support, one to photograph or record the objects or scenes on one side and the other to record the objects and scenes on the other side, and so forth.

The apparatus can be readily mounted and connected, or "geared-up" with the mechanism of a railroad train.

It will be understood that my apparatus is suitably adapted for recording street scenes, rural scenes, as when passing along a road; scenes in a canyon, as well as scenes at any other place, whether it be in a canyon or in a dirigible flying machine, or the like.

While I have described the preferred embodiments of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claim.

What I claim is:

In an apparatus of the class described, the combination of a traveling support adapted to pass along a desired course, of a sound recording machine and a motion picture camera in parallel position upon and carried by said traveling support contiguous to each other and pointing in the same direction for photographing and recording an object or scene simultaneously, parallel driving mechanisms projecting rearwardly from said sound recording machine and motion picture camera, a belt connecting said driving mechanisms, a power shaft to one side of said sound recording machine, and a belt in parallelism with said first-mentioned belt and connecting said power shaft and the driving mechanism of the sound recording machine, substantially as shown and described.

In testimony whereof I hereunto affix my signature.

ISAAC T. PURCELL.